United States Patent
Yamada et al.

(10) Patent No.: US 8,965,663 B2
(45) Date of Patent: Feb. 24, 2015

(54) FUEL INJECTION CONTROL APPARATUS FOR INTERNAL COMBUSTION ENGINE AND METHOD FOR CONTROLLING INTERNAL COMBUSTION ENGINE

(75) Inventors: Haruhiko Yamada, Wako (JP); Masaaki Nagashima, Wako (JP); Kan Nakaune, Wako (JP); Tatsuhito Esaki, Wako (JP); Nobuaki Ito, Wako (JP); Kentaro Miki, Wako (JP); Yutaka Sugahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 13/358,517

(22) Filed: Jan. 26, 2012

(65) Prior Publication Data

US 2012/0197512 A1 Aug. 2, 2012

(30) Foreign Application Priority Data

Jan. 31, 2011 (JP) ................................. 2011-017996

(51) Int. Cl.
*F02D 41/40* (2006.01)
*F02D 41/20* (2006.01)

(52) U.S. Cl.
CPC .............. *F02D 41/20* (2013.01); *F02D 41/403* (2013.01); *F02D 2041/2003* (2013.01); *F02D 2200/503* (2013.01); *Y02T 10/44* (2013.01)
USPC .......................................... 701/105; 123/299

(58) Field of Classification Search
USPC .......................................... 701/105; 123/299
See application file for complete search history.

(56) References Cited

U.S. PATENT DOCUMENTS

| 5,402,760 | A * | 4/1995 | Takeuchi et al. | 123/300 |
|---|---|---|---|---|
| 6,386,176 | B1 * | 5/2002 | McGee | 123/299 |
| 6,450,149 | B1 * | 9/2002 | McGee | 123/480 |
| 7,234,439 | B2 * | 6/2007 | Kikutani et al. | 123/299 |
| 8,620,563 | B2 * | 12/2013 | Tsuji et al. | 701/104 |
| 2002/0096140 | A1 * | 7/2002 | Heinzelmann | 123/299 |
| 2005/0126535 | A1 * | 6/2005 | Nishimaki | 123/299 |
| 2005/0229898 | A1 * | 10/2005 | Kikutani et al. | 123/299 |
| 2007/0215097 | A1 * | 9/2007 | Watanabe | 123/299 |
| 2010/0114459 | A1 * | 5/2010 | Engelmann et al. | 701/105 |

FOREIGN PATENT DOCUMENTS

| JP | 07-324661 | 12/1995 |
|---|---|---|
| JP | 2001-214785 | 8/2001 |
| JP | 2007-077996 | 3/2007 |

OTHER PUBLICATIONS

Japanese Office Action for corresponding JP Application No. 2011-017996, Jan. 21, 2013.

* cited by examiner

*Primary Examiner* — Erick Solis
(74) *Attorney, Agent, or Firm* — Mori & Ward, LLP

(57) ABSTRACT

A fuel injection control apparatus includes a first injection timing setting device, a target second injection timing setting device, a reference injection timing calculator, and a second injection timing setting device. The reference injection timing calculator is configured to calculate, as a reference injection timing, a timing at which a second-injection boosting operation is to be completed. The second-injection boosting operation is to re-boost a reduced voltage which has been reduced because of an execution of a first injection operation by using a booster circuit. The second injection timing setting device is configured to set, as a second injection timing at which a second injection operation is to be started, a later one of a target second injection timing set by the target second injection timing setting device and the reference injection timing calculated by the reference injection timing calculator.

10 Claims, 6 Drawing Sheets

US 8,965,663 B2

FUEL INJECTION CONTROL APPARATUS FOR INTERNAL COMBUSTION ENGINE AND METHOD FOR CONTROLLING INTERNAL COMBUSTION ENGINE

CROSS-REFERENCE TO RELATED APPLICATIONS

The present application claims priority under 35 U.S.C. §119 to Japanese Patent Application No. 2011-017996, filed Jan. 31, 2011, entitled "Fuel Injection Control Apparatus for Internal Combustion Engine." The contents of this application are incorporated herein by reference in their entirety.

BACKGROUND OF THE INVENTION

1. Field of the Invention

The present invention relates to a fuel injection control apparatus for an internal combustion engine, and a method for controlling an internal combustion engine.

2. Discussion of the Background

As a fuel injection control apparatus for an internal combustion engine of the related art, the control apparatus disclosed in Japanese Unexamined Patent Application Publication No. 7-324661 is known. The internal combustion engine disclosed in this publication is a diesel engine including a fuel injection valve for each cylinder. The fuel injection valve directly injects fuel into a combustion chamber. Fuel is injected from a fuel injection valve separately a plurality of times (pilot injection and main injection): a small amount of fuel is injected at a predetermined crank angle in a compression stroke (e.g., 35 to 40 degrees before the compression top dead center (TDC)) (pilot injection); and the remaining majority of fuel is injected around the compression top dead center (main injection). Such divisional injection makes combustion of the injected fuel slow, thereby suppressing noise that accompanies combustion.

SUMMARY OF THE INVENTION

According to one aspect of the present invention, a fuel injection control apparatus is for an internal combustion engine in which a voltage boosted in a booster circuit is supplied to a fuel injection valve so that fuel is injected from the fuel injection valve separately a plurality of times by a first injection operation and a second injection operation. The fuel injection control apparatus includes a first injection timing setting device, a target second injection timing setting device, a reference injection timing calculator, and a second injection timing setting device. The first injection timing setting device is configured to set, as a first injection timing, a timing at which the first injection operation is to be started. The first injection operation is followed by the second injection operation. The target second injection timing setting device is configured to set, as a target second injection timing, a target timing at which the second injection operation is to be started. The reference injection timing calculator is configured to calculate, as a reference injection timing, a timing at which a second-injection boosting operation is to be completed. The second-injection boosting operation is to re-boost a reduced voltage which has been reduced because of an execution of the first injection operation by using the booster circuit. The second injection timing setting device is configured to set, as a second injection timing at which the second injection operation is to be started, a later one of the target second injection timing set by the target second injection timing setting device and the reference injection timing calculated by the reference injection timing calculator.

According to another aspect of the present invention, a method is for controlling an internal combustion engine in which a voltage boosted in a booster circuit is supplied to a fuel injection valve so that fuel is injected from the fuel injection valve separately a plurality of times by a first injection operation and a second injection operation, the first injection operation being followed by the second injection operation, the method including: setting, as a first injection timing, a timing at which the first injection operation is to be started by using a first injection timing setting device; setting, as a target second injection timing, a target timing at which the second injection operation is to be started by using a target second injection timing setting device; calculating, as a reference injection timing, a timing at which a second-injection boosting operation is to be completed by using the reference injection timing calculator, the second-injection boosting operation being to re-boost a reduced voltage which has been reduced because of an execution of the first injection operation by using the booster circuit; and setting, as a second injection timing at which the second injection operation is to be started, a later one of the target second injection timing set by the target second injection timing setting device and the reference injection timing calculated by the reference injection timing calculator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
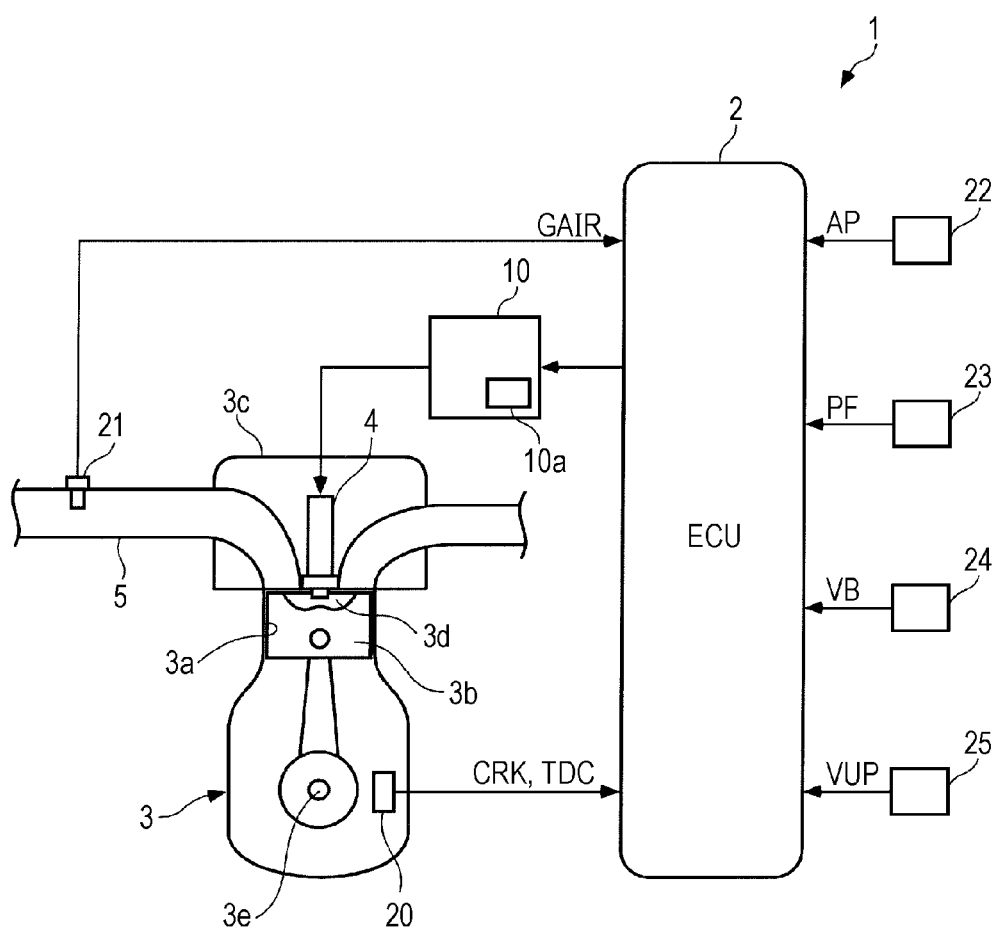
FIG. 1 schematically illustrates, together with an internal combustion engine, a fuel injection control apparatus according to an embodiment of the present invention.

The embodiments will now be described with reference to the accompanying drawings, wherein like reference numerals designate corresponding or identical elements throughout the various drawings.

A fuel injection control apparatus 1 for an internal combustion engine 3 according to an embodiment of the present invention will be described below with reference to the accompanying drawings. The fuel injection control apparatus 1 includes, as shown in FIG. 1, an engine control unit (ECU) 2. The ECU 2 performs various control operations, such as fuel injection control, for the internal combustion engine (hereinafter simply referred to as the "engine") 3, details of which will be given later.

The engine 3 is, for example, a diesel engine installed in a vehicle (not shown) and includes four cylinders 3a (only one is shown). A combustion chamber 3d is disposed between a piston 3b and a cylinder head 3c of each cylinder 3a, and a fuel injection valve 4 is attached to the cylinder head 3c of each cylinder 3a such that it faces the combustion chamber 3d.

The fuel injection valve 4 is connected to a high pressure pump and a fuel tank (neither of them is shown) via a common rail, and fuel boosted by the high pressure pump is supplied to the fuel injection valve 4 via the common rail. The fuel injection valve 4 is of the electromagnetic type and is electrically connected to the ECU 2 via a drive circuit 10. The drive circuit 10 includes a booster circuit 10a for boosting the voltage of a battery (not shown) and a switching device (not shown) for supplying (applying) the boosted voltage to the fuel injection valve 4.

With this configuration, the voltage boosted in the booster circuit 10a is supplied from the drive circuit 10 to cause the fuel injection valve 4 to open, thereby injecting fuel from the fuel injection valve 4 to the cylinder 3a. The ECU 2 controls the boosting operation performed by the booster circuit 10a and also controls the supply operation for supplying the voltage to the fuel injection valve 4, thereby controlling how long and when the fuel injection valve 4 is open, i.e., the fuel injection time (injection amount) and the fuel injection timing, respectively. In this embodiment, fuel injection by using the fuel injection valve 4 is performed separately a plurality of times by a first injection operation and a second injection operation during one combustion stroke. The first injection operation is followed by the second injection operation.

A crank angle sensor 20 is provided for a crankshaft 3e of the engine 3. The crank angle sensor 20 outputs a CRK signal and a TDC signal, which are pulse signals, to the ECU 2 in accordance with the rotation of the crankshaft 3e. The CRK signal is output at every predetermined crank angle (e.g., one degree). The ECU 2 calculates the rotation speed of the engine 3 (hereinafter referred to as the "engine speed") NE on the basis of the CRK signal.

The TDC signal is a signal indicating that the piston 3b of any of the cylinders 3a is positioned at a predetermined crank angle which is slightly before the TDC position at the start of the intake stroke. If the internal combustion engine 3 is a four-cylinder engine, as in this embodiment, the TDC signal is output at every crank angle of 180°. The ECU 2 calculates the crank angle CA on the basis of the TDC signal and the CRK signal. This crank angle CA is calculated so that it increases in the direction in which the operation timing is retarded, assuming that the crank angle position at which the TDC signal is generated is 0.

An air flow sensor 21 is provided in an intake passage 5 of the engine 3. The air flow sensor 21 detects the flow rate of air taken into the cylinder 3a through the intake passage 5 (hereinafter referred to as the "intake air rate") GAIR, and outputs a detection signal representing GAIR to the ECU 2.

The following detection signals are output to the ECU 2. A detection signal representing the position of an accelerator pedal (not shown) (i.e., the amount by which the accelerator pedal is depressed) of a vehicle (hereinafter referred to as the "accelerator opening") AP is output from an accelerator opening sensor 22. A detection signal representing the pressure of fuel within the common rail (hereinafter referred to as the "fuel pressure") PF is output from a fuel pressure sensor 23. A detection signal representing the voltage of the battery (hereinafter referred to as the "battery voltage") VB is output from a battery voltage sensor 24. A detection signal representing the voltage boosted in the booster circuit 10a (hereinafter referred to as the "boosted voltage") VUP is output from a boosted voltage sensor 25.

The ECU 2 is constituted of a microcomputer including a central processing unit (CPU), a random access memory (RAM), a read only memory (ROM), an input/output (I/O) interface (none of which are shown), etc. The ECU 2 determines the operating state of the engine 3 from the detection signals of the above-described sensors 20 through 25, and also performs various control operations, such as fuel injection control processing and boosting control processing. In this embodiment, the ECU 2 corresponds to a first injection timing setting unit, a target second injection timing setting unit, a reference injection timing calculator, and a second injection timing setting unit.

A description will now be given, with reference to FIG. 2, of fuel injection control processing executed by the ECU 2. In this fuel injection control processing, the injection time and the injection start timing of each of the first injection operation and the second injection operation are calculated. The fuel injection control processing is performed for each cylinder 3a in synchronization with the generation of the TDC signal. Hereinafter, the injection time and the injection start timing of the first injection operation are referred to as the "first injection time TINJ1" and the "first injection timing φINJ1", respectively. Similarly, the injection time and the injection start timing of the second injection operation are referred to as the "second injection time TINJ2" and the "second injection timing φINJ2", respectively.

In this processing, in step S1 (shown as "S1" in FIG. 2, and the other step numbers being expressed in the same way), the total injection time TINJ of the first injection time TINJ1 and the second injection time TINJ2 is calculated as follows. The basic injection time is first calculated in accordance with the engine speed NE and the intake air rate GAIR by searching a predetermined map (not shown), and is corrected in accordance with the fuel pressure PF.

Then, in step S2, the division ratio R1, which is the ratio of the first injection time TINJ1 to the total injection time TINJ, is calculated in accordance with the engine speed NE and the intake air rate GAIR by searching a predetermined map (not shown). Then, in step S3, the product R1·TINJ of the division ratio R1 and the total injection time TINJ is set as the first injection time TINJ1.

In step S4, the first injection timing φINJ1 is calculated in accordance with the first injection time TINJ1, the engine speed NE, and the intake air rate GAIR by searching a predetermined map (not shown). The first injection timing φINJ1 is indicated by the crank angle CA, and the second injection timing φINJ2, and other various timings φ2_TMP and φ2_ND, which will be discussed later, are also indicated by the crank angle CA.

Then, in step S5, the product (1-R1)·TINJ is set as the second injection timing φINJ2. In step S6, the target second injection timing φ2_TMP, which is the target value of the second injection timing φINJ2 based on the operating state of the engine 3, is calculated in accordance with the second injection time TINJ2, the engine speed NE, and the intake air rate GAIR by searching a predetermined map (not shown). Finally, in step S7, the second injection timing φINJ2 is calculated. The processing is then completed.

Figure 3:
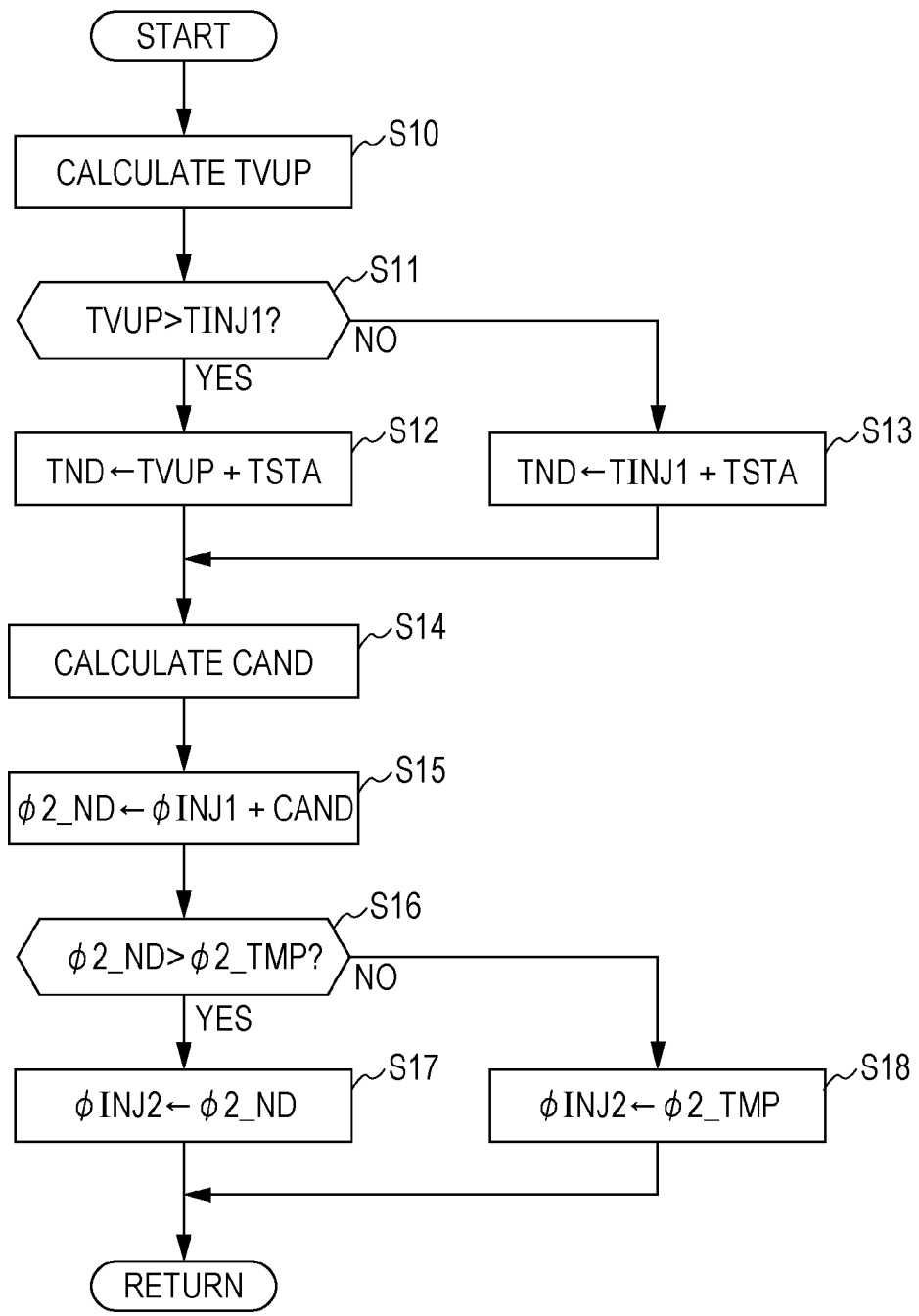
FIG. 3 is a flowchart illustrating a subroutine for calculating second injection timing.

FIG. 3 is a flowchart illustrating a subroutine for calculating the second injection timing φINJ2. In this processing, in step S10, the required boosting time TVUP is calculated in accordance with the detected battery voltage VB by searching the table shown in FIG. 4. The required boosting time TVUP corresponds to the time taken to allow the boosted voltage VUP, which has been temporarily reduced because of the execution of the first injection operation, to reach the target value VREF (e.g., 42 V) by using the booster circuit 10a.

Figure 4:
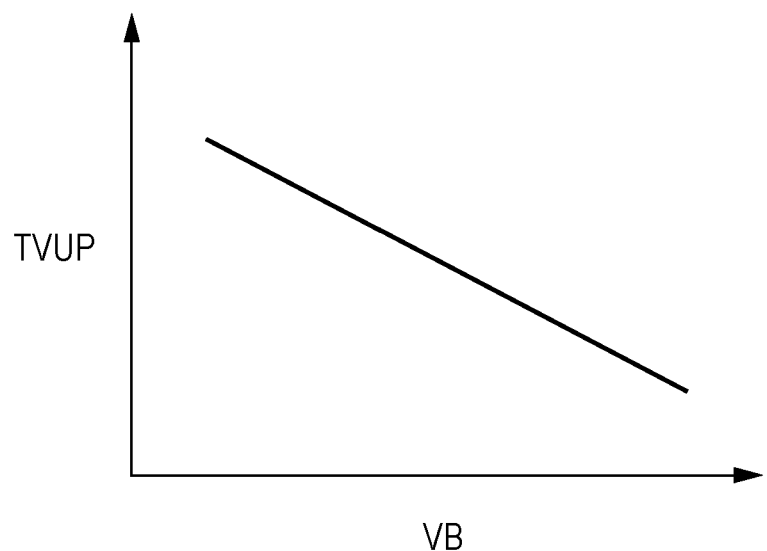
FIG. 4 illustrates a table for calculating a required boosting time.

Accordingly, in the table shown in FIG. 4, as the battery voltage VB is higher, the required boosting time TVUP is set to be smaller.

Then, it is determined in step S11 whether the calculated required boosting time TVUP is longer than the first injection time TINJ1 calculated in step S3. If the result of step S11 is YES, the process proceeds to step S12. In step S12, the sum (=TVUP+TSTA) of the required boosting time TVUP and a predetermined operation-restricted time TSTA is set to be the reference time TND. The operation-restricted time TSTA corresponds to the time necessary for the boosted voltage VUP to become stable around the target value VREF after the boosted voltage VUP has reached the target value VREF. Accordingly, the reference time TND corresponds to the time taken to complete the boosting operation necessary for the second injection operation (hereinafter simply referred to the "second-injection boosting operation) after the boosted voltage VUP, which has been reduced because of the execution of the first injection operation, has been re-boosted and has become stable around the target voltage VREF.

If the result of step S11 is NO, the process proceeds to step S13. In step S13, the sum (=TINJ1+TSTA) of the first injection time TINJ1 and the operation-restricted time TSTA is set as the reference time TND.

Then, in step S14, the converted angle value CAND is calculated on the basis of the reference time TND calculated in step S12 or S13 and the engine speed NE. The converted angle value CAND is a crank angle converted from the reference time TND based on the engine speed NE.

Then, in step S15, the sum ($\phi$INJ1+CAND) of the first injection timing $\phi$INJ1 and the converted angle value is set to be the reference injection timing $\phi$2_ND. When the required boosting time TVUP is longer than the first injection time TINJ1, the reference injection timing $\phi$2_ND corresponds to the timing at which the second-injection boosting operation for the boosted voltage VUP, which has been reduced because of the execution of the first injection operation, was completed (see FIG. 6).

Then, in step S16, it is determined whether the value of the reference injection timing $\phi$2_ND is larger than that of the target second injection timing $\phi$2_TMP. If the result of step S16 is YES, it means that that the completion of the second-injection boosting operation is later than the target second injection timing $\phi$2_TMP. In this case, it is necessary to delay the start timing of the second injection operation in accordance with the timing at which the boosting operation will be completed. Thus, the process proceeds to step S17 in which the reference injection timing $\phi$2_ND is set as the second injection timing $\phi$INJ2. The processing is then completed.

If the result of step S16 is NO, it means that the second-injection boosting operation will be completed at the same time as or before the target second injection timing $\phi$2_TMP. Thus, the process proceeds to step S18 in which the target second injecting timing $\phi$2_TMP is set as the second injection timing $\phi$INJ2. The process is then completed.

Figure 5:
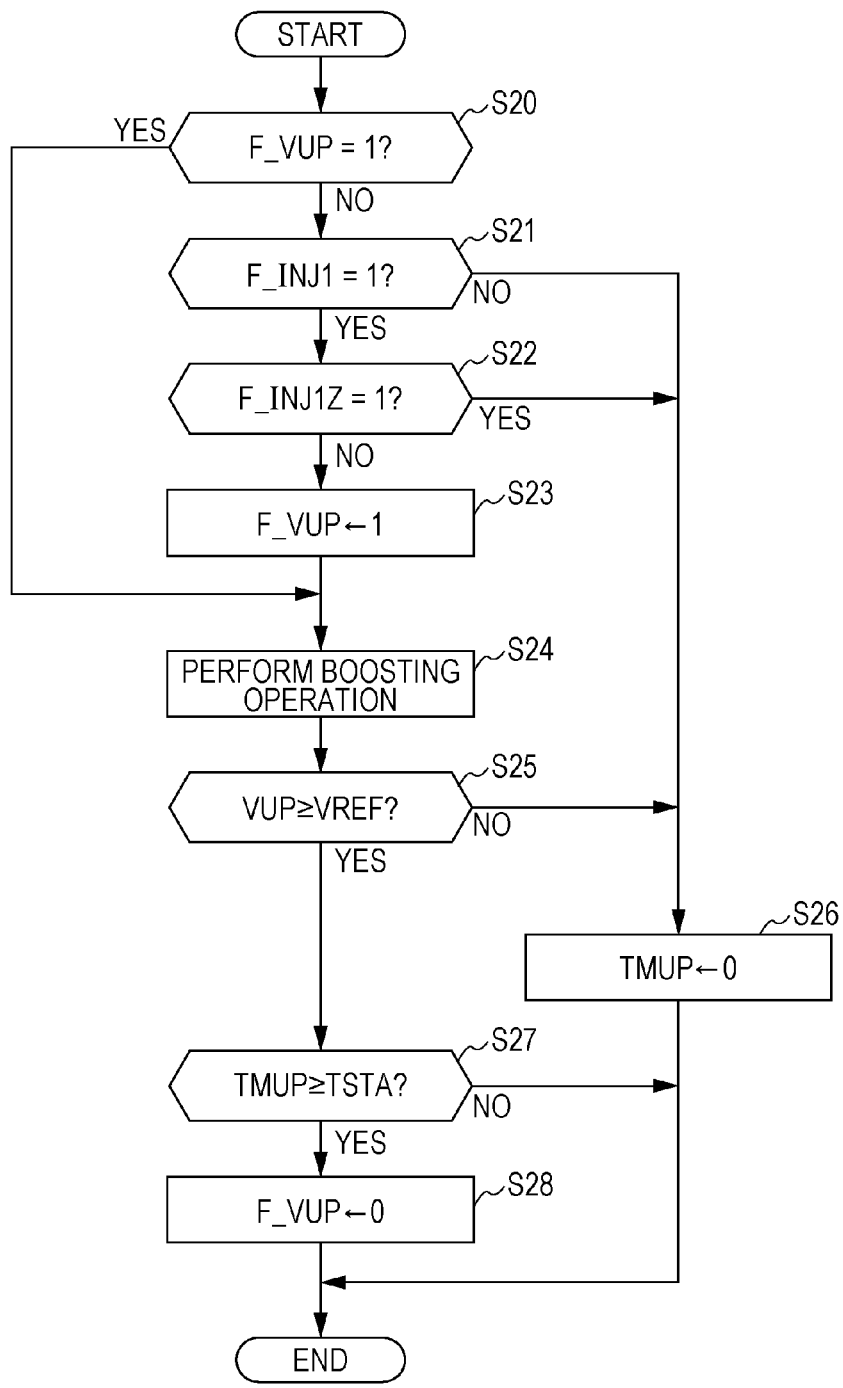
FIG. 5 is a flowchart illustrating second-injection boosting control processing.

Boosting control processing performed by the ECU 2 will now be described below with reference to FIG. 5. In this boosting control processing, the boosted voltage VUP, which has been reduced because of the execution of the first injection operation, is re-boosted to the target value VREF for the second injection operation. The boosting control operation is performed at predetermined intervals (e.g., 10 msec) for each cylinder 3a.

In this processing, it is first determined in step S20 whether the boosting control flag F_VUP is "1". If the result of step S20 is NO, it means that the second-injection boosting operation is not being performed. Thus, the process proceeds to step S21 to determine whether the first-injection execution flag F_INJ1 is "1". The first-injection execution flag F_INJ1 is set to be "1" in determination processing (not shown) when the first injection operation has been performed in the current combustion stroke of the cylinder 3a.

If the result of step S21 is NO, it means that the first injection operation has not yet been performed in the current combustion stroke of the cylinder 3a. Thus, the process proceeds to step S26. In step S26, the value of a count-up booting timer (hereinafter referred to as the "boosting timer value") TMUP is reset to 0. The processing is then completed. If the result of step S21 is YES, it means that the first injection operation has been performed in the current combustion stroke of the cylinder 3a. Thus, the process proceeds to step S22 to determine whether the previous value F_INJ1Z of the first-injection execution flag is "1".

If the result of step S22 is YES, the process proceeds to step S26. After the execution of step S26, the processing is completed. In contrast, if the result of step S22 is NO, it means that the first injection operation has just been performed in this current combustion stroke. It is thus necessary to perform the second-injection boosting operation. The process then proceeds to step S23 in which the boosting control flag F_VUP is set to be "1". In this manner, if the boosting control flag F_VUP is set to be "1", the result of step S20 in the next combustion stroke becomes YES. The process then proceeds to step S24.

In step S24 after step S20 or S23, the boosting operation is performed by using the booster circuit 10a. The process then proceeds to step S25 to determine whether the boosted voltage VUP is equal to or greater than the target value VREF. If the result of step S25 is NO, the process proceeds to step S26. After the execution of step S26, the processing is completed, and the boosting operation is continuously performed. In contrast, if the result of step S25 is YES, it means that the boosted voltage VUP has reached the target value VREF. The process then proceeds to step S27 to determine whether the boosting timer value TMUP is equal to or greater than the operation-restricted time TSTA.

If the result of step S27 is NO, the processing is completed, and the boosting operation is continuously performed. In contrast, if the result of step S27 is YES, it means that the operation-restricted time TSTA has elapsed after the boosted voltage VUP reached the target value VREF. That is, the boosted voltage VUP has become stable. It is thus necessary to finish the boosting operation. The process then proceeds to step S28 in which the boosting control flag F_VUP is set to be "0" in order to indicate that the boosted voltage VUP has become stable. The processing is then completed.

A description will now be given in brief, with reference to FIG. 6, of an example of an operation obtained by the above-described fuel injection control processing. It is assumed, in this example, that the required boosting time TVUP is longer than the first injection time TINJ1 and that the reference injection timing $\phi$2_ND is later than the target second injection timing $\phi$2_TMP.

Figure 2:
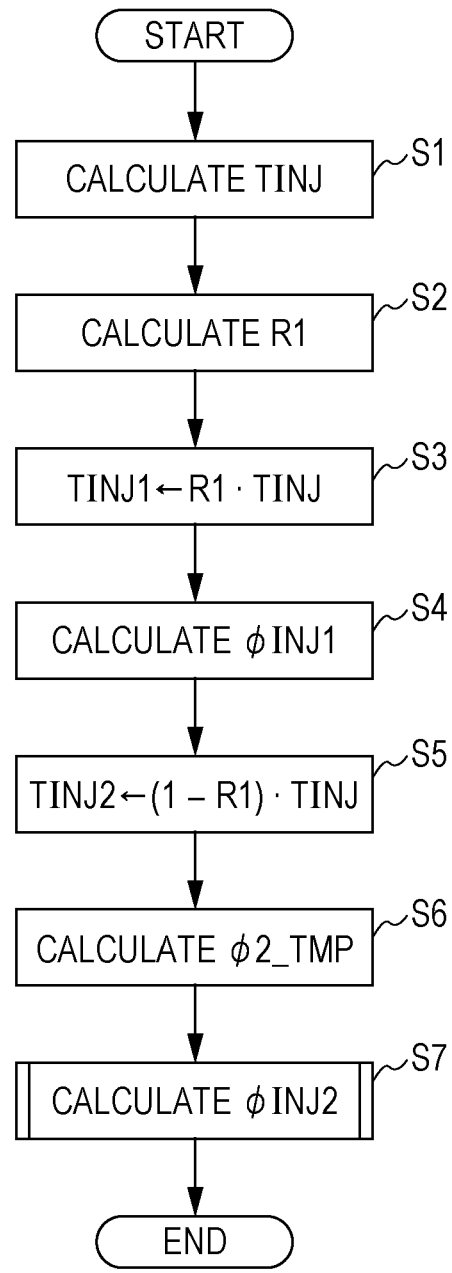
FIG. 2 is a flowchart illustrating fuel injection control processing.

First, by performing the fuel injection control processing (steps S1 to S6) shown in FIG. 2, the first injection time TINJ1, the first injection timing $\phi$INJ1, the second injection time TINJ2, and the target second injection timing $\phi$2_TMP are calculated on the basis of the engine speed NE and the intake air rate GAIR.

In this example, since the required boosting time TVUP is longer than the first injection time TINJ1 (YES in step S11 of FIG. 3), the sum of the required boosting time TVUP and the operation-restricted time TSTA is set as the reference time TND (step S12).

Then, the converted angle value CAND which has been converted from the reference time TND is calculated (step S14), and also, the sum of the first injection timing φINJ1 and the converted angle value CAND is calculated as the reference injection timing φ2_ND (step S15). As discussed above, the reference injection timing φ2_ND corresponds to the timing at which the second-injection boosting operation for boosting the boosted voltage VUP, which has been reduced because of the execution of the first injection operation, was completed. In this example, the reference injection timing φ2_ND is later than the target second injection timing φ2_TMP (YES in step S16), and thus, the reference injection timing φ2_ND, which is later than the target second injection timing φ2_TMP, is set as the second injection timing φINJ2 (step S17).

In accordance with the boosting control processing for the boosting operation by using the booster circuit 10a and the supply control processing for supplying the voltage from the drive circuit 10 to the fuel injection valve 4 on the basis of the fuel injection parameters which have been set as described above, the first injection operation and the second injection operation are performed. More specifically, when the crank angle CA reaches the first injection timing φINJ1, the first injection operation is started and is performed until the first injection time TINJ1 elapses. Additionally, by performing the boosting control processing shown in FIG. 5, the second-injection boosting operation is started at the same time as the first injection operation. Then, when the crank angle reaches the second injection timing φINJ2 (in this case, the reference injection timing φ2_ND), the second injection operation is started and is performed until the second injection time TINJ2 elapses.

Figure 6:
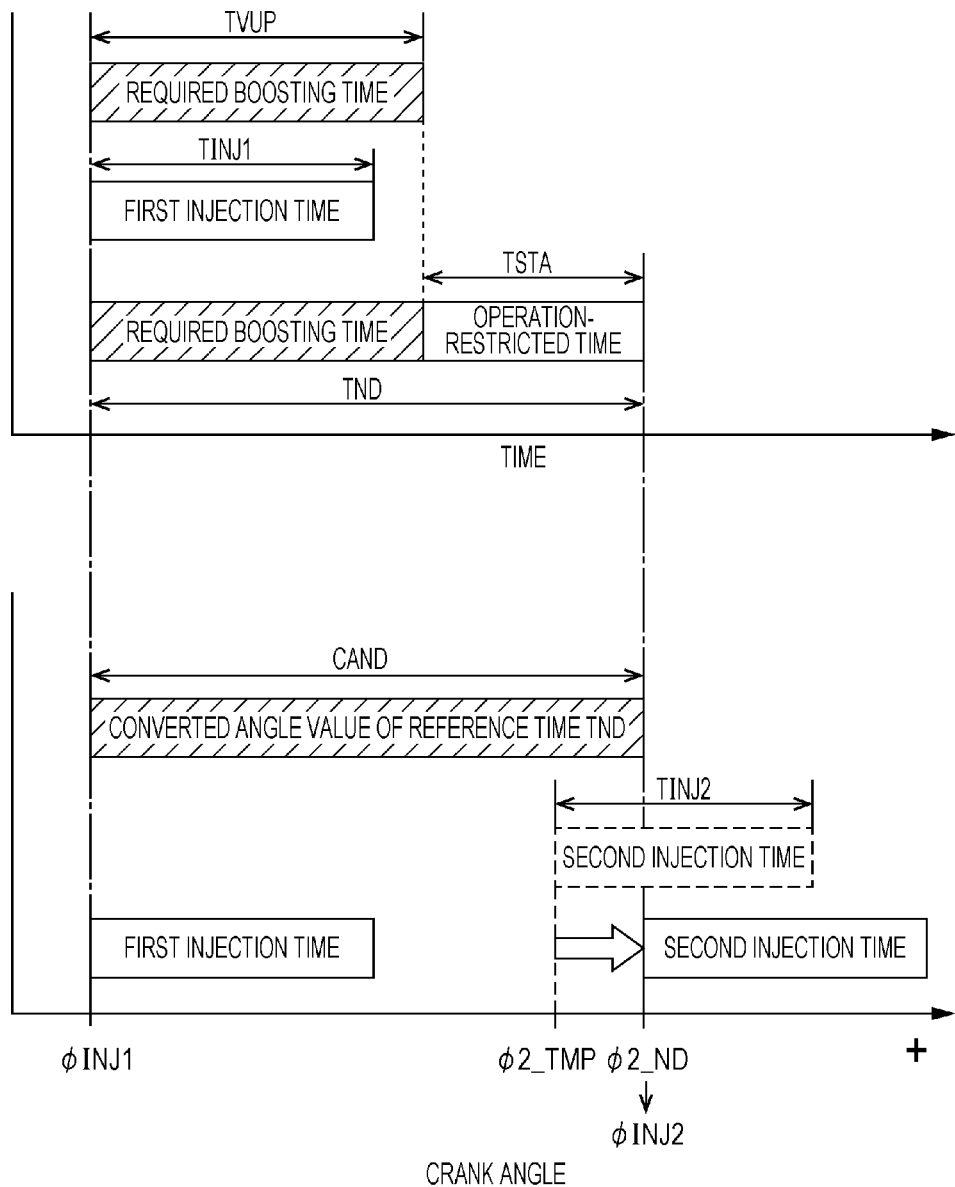
FIG. 6 is a timing chart illustrating an example of an operation obtained by fuel injection control processing.

Although it is not shown in FIG. 6, if the required boosting time TVUP is equal to or shorter than the first injection time TINJ1, the sum of the first injection time TINJ1 and the operation-restricted time TSTA is set as the reference time TND (step S13). Thereafter, fuel injection control is performed similarly on the basis of the reference time TND. If the reference injection timing φ2_ND is the same as or earlier than the target second injection timing φ2_TMP, the target second injection timing φ2_TMP is set as the second injection timing φINJ2 (step S18). Then, when the crank angle CA reaches the target second injection timing φ2_TMP, the second injection operation is started.

As described above, according to this embodiment, the timing at which the second-injection boosting operation for re-boosting the voltage, which has been temporarily reduced because of the execution of the first injection operation, will be completed is calculated to be the reference injection timing φ2_ND. Additionally, between the target second injection timing φ2_TMP and the reference injection timing φ2_ND, the later timing is set as the final second injection timing φINJ2.

The second injection timing φINJ2 is set as described above. Thus, if the reference injection timing φ2_ND at which the second-injection boosting operation will be completed is later than the target second injection timing φ2_TMP because, for example, the engine 3 is operated at a high speed, the reference injection timing φ2_ND is set as the second injection timing φINJ2. Accordingly, after the first injection operation has started, the time to boost the voltage for the second injection operation can be secured before the second injection operation is started. This makes it possible to inject a desired amount of fuel with high precision when performing the second injection operation. As a result, it is possible to prevent combustion from deteriorating due to the deficiency or variation in the amount of fuel supplied.

If the reference injection timing φ2_ND is the same as or earlier than the target second injection timing φ2_TMP, the target second injection timing φ2_TMP, which was originally set in accordance with the engine speed NE and the intake air rate GAIR, is set as the second injection timing φINJ2. Thus, the second injection operation can be started at an appropriate timing according to the operating state of the engine 3.

Additionally, if the required boosting time TVUP is longer than the first injection time TINJ1, the sum of the required boosting time TVUP and the operation-restricted time TSTA is set as the reference time TND, which is the basis for the reference injection timing φ2_ND. Thus, the second injection operation can be started when the boosted voltage VUP has stably converged to the target value VREF, thereby making it possible to perform the second injection operation with high precision.

When calculating the reference time TND, the operation-restricted time TSTA is added to the greater value of the required boosting time TVUP and the first injection time TINJ1 (steps S11 to S13). Accordingly, not only the second-injection boosting time, but also the time to perform the first injection operation, can be secured, thereby making it possible to reliably perform the first injection operation.

The present invention is not restricted to the above-described embodiment, and may be carried out in various modes. For example, in the above-described embodiment, the second-injection boosting operation is started at the same time as the start of the first injection operation. However, the second-injection boosting operation may be started when the boosted voltage VUP becomes lower than a predetermined threshold after the start of the first injection operation. In this case, as the required boosting time TVUP, which is compared with the first injection time TINJ1, the sum of the time from the start of the first injection operation until the start of the boosting operation and the time from the start of the boosting operation until the time necessary to allow the boosted voltage VUP to reach the target value VREF may be used.

In the above-described embodiment, the operation-restricted time TSTA is added to the greater value of the required boosting time TVUP and the first injection time TINJ1, thereby calculating the reference time TND. However, the sum of the required boosting time TVUP and the operation-restricted time TSTA may be compared with the first injection time TINJ1, and the greater value thereof may be calculated as the reference time TND. In this case, as in the embodiment, the second-injection boosting time and the time necessary to perform the first injection operation can be simultaneously secured.

In the above-described embodiment, the operation-restricted time TSTA is a predetermined fixed value. Alternatively, a suitable variable parameter may be set in accordance with, for example, the battery voltage VB.

In the above-described embodiment, the present invention is applied to a vehicle diesel engine. However, the present invention is not restricted to this. On the condition that the first injection operation and the second injection operation are performed, the invention may find wide applications in industrial internal combustion engines, such as a gasoline engine, an LPG engine, an engine used in a ship propulsion system, e.g., in an outboard motor including a vertical crankshaft. Additionally, details of the configuration may be modified appropriately within the scope of the invention.

According to the embodiment of the present invention, there is provided a fuel injection control apparatus for an internal combustion engine, in which a voltage (boosted voltage VUP) boosted in a booster circuit is supplied to a fuel injection valve so that fuel is injected from the fuel injection valve separately a plurality of times by a first injection operation and a second injection operation, the first injection operation being followed by the second injection operation. The fuel injection control apparatus includes: a first injection timing setting unit (ECU2, step S4) that sets, as a first injection timing, a timing at which the first injection operation is to be started; a target second injection timing setting unit (ECU 2, step S6) that sets, as a target second injection timing, a target timing at which the second injection operation is to be started; a reference injection timing calculator (ECU 2, step S15) that calculates, as a reference injection timing, a timing at which a second-injection boosting operation for re-boosting a voltage, which has been reduced because of the execution of the first injection operation, by using the booster circuit is to be completed; and a second injection timing setting unit (ECU 2, steps S16 to S18) that sets, as a second injection timing at which the second injection operation is to be started, a later one of the target second injection timing set by the target second injection timing setting unit and the reference injection timing calculated by the reference injection timing calculator.

When, for example, the internal combustion engine is operating at a high speed, the time interval for switching from the first injection operation to the second injection operation becomes short, and thus, the reference injection timing at which the second-injection boosting operation will be completed is later than the target second injection timing. With the above-described control operation, the reference injection timing is set as the second injection timing. Accordingly, after the first injection operation has started, the time to re-boost the voltage for the second injection operation can be secured before the second injection operation is started. This makes it possible to inject a desired amount of fuel with high precision when performing the second injection operation. As a result, it is possible to prevent combustion from deteriorating due to the deficiency or variation in the amount of fuel supplied. If the reference injection timing is the same as or earlier than the target second injection timing, the target second injection timing, which was originally set, is set as the second injection timing. Thus, the second injection operation can be started at an appropriate timing according to, for example, the operating state of the internal combustion engine.

In the above-described fuel injection control apparatus, the reference injection timing may be delayed with respect to a timing at which the voltage boosted by the second-injection boosting operation reaches a target value, by an amount equal to an operation-restricted time, which is a time necessary to allow the voltage boosted by the second-injection boosting operation to become stable around the target value after the boosted voltage has reached the target value.

When boosting the voltage to a target value by using a booster circuit, the boosted voltage temporarily reaches the target value, and then, stably converges to the target value after the hunting state. With this configuration, the reference injection timing is delayed with respect to the timing at which the voltage boosted by the boosting operation reaches the target value, by an amount equal to the operation-restricted time. Accordingly, the second injection operation can be performed with high precision.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel injection control apparatus for an internal combustion engine in which a voltage boosted in a booster circuit is supplied to a fuel injection valve so that fuel is injected from the fuel injection valve separately a plurality of times by a first injection operation and a second injection operation, the fuel injection control apparatus comprising:

a first injection timing setting device configured to set, as a first injection timing, a crank angle at which the first injection operation is to be started, the first injection operation being followed by the second injection operation;

a target second injection timing setting device configured to set, as a target second injection timing, a crank angle at which the second injection operation is to be started;

a reference injection timing calculator configured to calculate, as a reference injection timing, a crank angle at which a second-injection boosting operation is to be completed, the second-injection boosting operation being to re-boost a reduced voltage which has been reduced because of an execution of the first injection operation by using the booster circuit; and a second injection timing setting device configured to set, as a second injection timing at which the second injection operation is to be started, a later one of the target second injection timing set by the target second injection timing setting device and the reference injection timing calculated by the reference injection timing calculator, wherein the reference injection timing calculator is configured to set, as a reference time, a sum of a required boosting time and an operation-restricted time, the required boosting time is a time necessary to allow the reduced voltage which has been reduced because of the execution of the first injection operation to reach a target value by the second-injection boosting operation, the operation-restricted time is a time necessary to allow a voltage boosted by the second-injection boosting operation to become stable around the target value after the voltage has reached the target value, wherein the reference injection timing calculator is configured to calculate a converted angle value which is a crank angle converted from the reference time based on an engine speed, and wherein the reference injection timing calculator is configured to calculate, as the reference injection timing, a sum of the first injection timing and the converted angle value.

2. The fuel injection control apparatus for an internal combustion engine according to claim 1, wherein as a battery voltage of a battery which is configured to supply an electric power to the booster circuit is higher, the required boosting time is set to be smaller.

3. The fuel injection control apparatus for an internal combustion engine according to claim 2, wherein the reference injection timing setting device is configured to calculate a required boosting time in accordance with a detected battery voltage of the internal combustion engine, the required boosting time corresponding to a time taken to allow the reduced voltage to reach the target value by using the booster circuit.

4. The fuel injection control apparatus for an internal combustion engine according to claim 3, wherein the reference injection timing setting device is configured to calculate the reference injection timing based on the required boosting time and the operation-restricted time.

5. The fuel injection control apparatus for an internal combustion engine according to claim 4, wherein the first injection timing setting device is configured to calculate a first injection time in which the first injection operation is performed and is configured to calculate the first injection timing based on the first injection time, the reference injection timing setting device calculates a sum of the required boosting time and the operation-restricted time to set the reference injection timing when the required boosting time is longer than the first injection time, and the reference injection timing setting device calculates a sum of the first injection time and the operation-restricted time to set the reference injection timing when the required boosting time is equal to or shorter than the first injection time.

6. A method for controlling an internal combustion engine in which a voltage boosted in a booster circuit is supplied to a fuel injection valve so that fuel is injected from the fuel injection valve separately a plurality of times by a first injection operation and a second injection operation, the first injection operation being followed by the second injection operation, the method comprising:

setting, as a first injection timing, a crank angle at which the first injection operation is to be started by using a first injection timing setting device;

setting, as a target second injection timing, a target crank angle at which the second injection operation is to be started by using a target second injection timing setting device;

calculating, as a reference injection timing, a crank angle at which a second-injection boosting operation is to be completed by using a reference injection timing calculator, the second-injection boosting operation being to re-boost a reduced voltage which has been reduced because of an execution of the first injection operation by using the booster circuit; and setting, as a second injection timing at which the second injection operation is to be started, a later one of the target second injection timing set by the target second injection timing setting device and the reference injection timing calculated by a reference injection timing calculator, wherein the reference injection timing calculator is configured to set, as a reference time, a sum of a required boosting time and an operation-restricted time, the required boosting time is a time necessary to allow the reduced voltage which has been reduced because of the execution of the first injection operation to reach a target value by the second-injection boosting operation, the operation-restricted time is a time necessary to allow a voltage boosted by the second-injection boosting operation to become stable around the target value after the voltage has reached the target value, wherein the reference injection timing calculator is configured to calculate a converted angle value which is a crank angle converted from the reference time based on an engine speed, and wherein the reference injection timing calculator is configured to calculate, as the reference injection timing, a sum of the first injection timing and the converted angle value.

7. The method according to claim 6, wherein as a battery voltage of a battery which is configured to supply an electric power to the booster circuit is higher, the required boosting time is set to be smaller.

8. The method according to claim 7, further comprising:

calculating a required boosting time in accordance with a detected battery voltage of the internal combustion engine, the required boosting time corresponding to a time taken to allow the reduced voltage to reach the target value by using the booster circuit.

9. The method according to claim 8, further comprising:

calculating the reference injection timing based on the required boosting time and the operation-restricted time.

10. The method according to claim 9, further comprising:

calculating a first injection time in which the first injection operation to calculate the first injection timing based on the first injection time;

calculating a sum of the required boosting time and the operation-restricted time to set the reference injection timing when the required boosting time is longer than the first injection time; and calculating a sum of the first injection time and the operation-restricted time to set the reference injection timing when the required boosting time is equal to or shorter than the first injection time.

* * * * *